United States Patent

Borom et al.

[11] 3,781,522
[45] Dec. 25, 1973

[54] THERMOCHROMIC SURFACE HEATING APPARATUS

[75] Inventors: Marcus P. Borom, Schenectady; Robert C. De Vries, Burnt Hills, both of N.Y.

[73] Assignee: General Electric Company, Schenectady, N.Y.

[22] Filed: Mar. 27, 1972

[21] Appl. No.: 238,421

[52] U.S. Cl............. 219/462, 73/356, 106/39 DV, 117/129, 252/408, 219/347, 219/461, 219/464, 219/530, 219/544
[51] Int. Cl............................................ H05b 3/68
[58] Field of Search............. 219/395, 436, 347, 219/462, 464, 530, 540, 542, 543, 544; 117/129, 212; 99/447; 106/39 DV; 73/356; 23/230; 252/408

[56] References Cited
UNITED STATES PATENTS

| | | | |
|---|---|---|---|
| 3,561,269 | 2/1971 | Seitz | 73/356 |
| 3,576,604 | 4/1971 | Hammond | 73/356 X |
| 3,569,672 | 3/1971 | Hurko | 219/464 |
| 3,622,754 | 11/1971 | Hurko | 219/462 |
| 3,328,145 | 6/1967 | McMillan et al. | 117/129 X |
| 2,859,321 | 11/1958 | Garaway | 219/345 |
| 2,939,807 | 6/1960 | Needham | 219/345 X |
| 3,263,675 | 8/1966 | Rice et al. | 117/129 X |
| 3,505,498 | 4/1970 | Shevlin | 219/438 X |
| 3,573,073 | 3/1971 | Dulce et al. | 106/39 DV |
| 3,646,321 | 2/1972 | Siegea | 219/464 |

OTHER PUBLICATIONS

W. A. Weye, Coloured Glasses, Society of Glass Technology, 1967, QD 139, G5W4, pp. 308–313.

*Primary Examiner*—Volodymyr Y. Mayewsky
*Attorney*—Gerhard K. Adam et al.

[57] ABSTRACT

A smooth surface heating apparatus is provided having a heat spreader plate of high thermal conductivity coated, at least on its upper surface, with a thermochromic glass ceramic material containing a predominant crystalline phase of lithium disilicate in a glassy matrix and having a coefficient of expansion in the range of $80-120 \times 120 \times^{-7}$ per °C. The thermochromic property is obtained by the presence of basic lead chromate in the glass-ceramic coating. An insulated electrical resistance heating element and a reinforcing member are attached to the underside of the heat spreader plate. A reflector pan is provided beneath the heating element to direct the heat in an upward direction.

7 Claims, 3 Drawing Figures

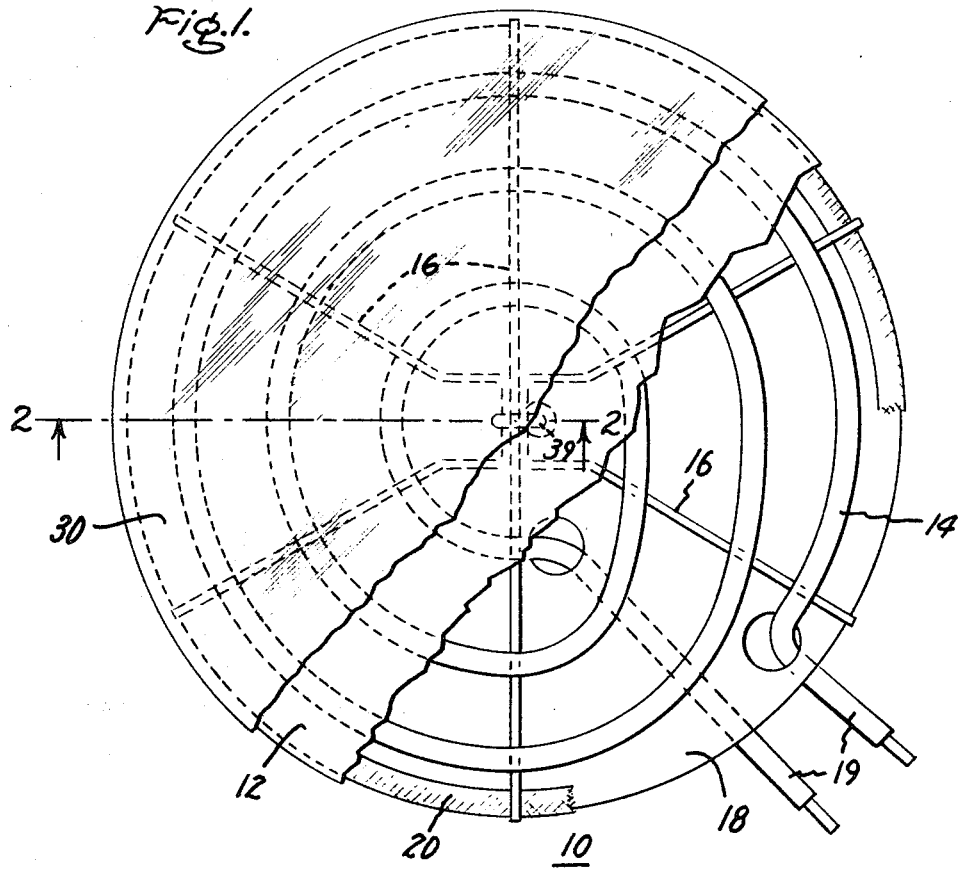
Fig.1.
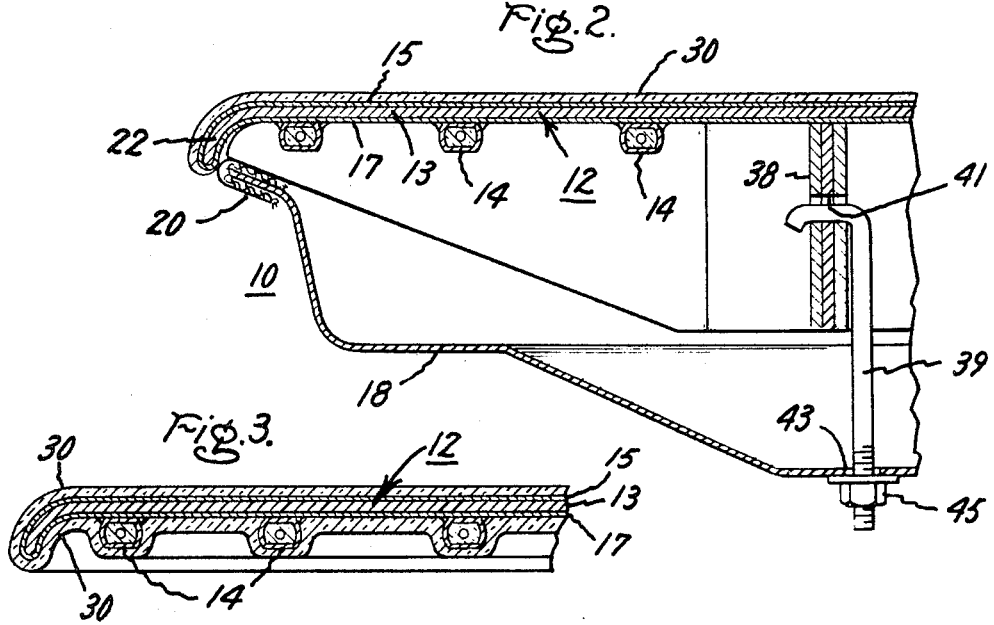
Fig.2.
Fig.3.

THERMOCHROMIC SURFACE HEATING APPARATUS

Conventional electric cooktops are usually provided with a plurality of metal sheathed electrical resistance heating elements which are each wound in the form of a spiral coil and positioned in an opening formed in the cooktop. Each heating element is adapted to support a cooking utensil thereon. Food soil can be automatically cleaned from the metal sheathed heating elements by the high temperatures reached once the elements are energized, while any spillovers are permitted to drain through the heating element and are accumulated in a collection pan located beneath the cooktop from which they must be manually cleaned.

In order to simplify the cleaning process and to provide a more esthetic appearance, entire counter cooktops or in some cases individual solid surface heating units have been manufactured in which the exposed surface is formed from a glass-ceramic material such as described in U.S. Pat. No. 2,920,971. Materials of this type are commercially available under the trademarks "PYROCERAM", "CER-VIT", and "HERCUVIT". The opaque glass-ceramic, because of its smooth top surface, not only presents a pleasing appearance, but is also readily cleanable and avoids the drainage of spillovers into the subsurface portions of the unit.

However, a problem which must be considered is that of obtaining rapid heating rates and rapid cooling rates comparable to those of either a standard metal sheathed electrical resistance heating element or a gas surface burner. The rapid transfer of heat through a thick glass-ceramic material does not occur because of its rather poor thermal conductivity. Such materials are widely used as both thermal and electrical insulators, rather than as thermal conductors. Heat does not readily diffuse laterally through the glass-ceramic plate, and during the cooking procedure heat is transferred to the utensil primarily by means of conduction at points of contact between the heating surface unit and the utensil. Moreover, the glass-ceramic plate has a comparatively large heat capacity, which further contributes to slow cooling when the heating element is turned off. Also, this type of glass-ceramic plate becomes more electrically conductive as the temperature is increased, so that a safety hazard might be created when an open-coiled heater is employed as the electrical heating means.

Some of the problems of the prior art have been overcome by locating beneath the glass-ceramic plate a heat spreader plate of high thermal conductivity which bears against the underside of the glass-ceramic plate by mechanical means and thereby creates an even temperature distribution as disclosed in U.S. Pat. No. 3,622,754. Such a unit is capable of efficient operation when used with conventional cooking utensils.

A further improvement has been made by Borom et al., U.S. patent application Ser. No. 236,104, filed Mar. 20, 1972, (RD-4299) which discloses a smooth surface heating apparatus having a heat spreader plate of high thermal conductivity, coated at least on its upper surface, with a glass-ceramic material containing a predominant crystalline phase of lithium disilicate in a glassy matrix and having a coefficient of expansion in the range of $80-120 \times 10^{-7}$ per °C. The disclosure set forth in that patent application is hereby incorporated by reference. Commercially available electric cooktops usually have an indicator light to show when the heating unit is on. However, even after the heating unit has been turned off, the cooktop may still remain quite hot and reasonable care must be exercised to avoid burn hazards.

Quite surprisingly, we have now discovered an improved surface heating unit in which the glass-ceramic coating contains a thermochromic material capable of imparting a reversible color transformation to the coating upon exposure to temperature changes. Thus the glass-ceramic coating not only has chemical corrosion resistance, high mechanical strength, good adhesion to the substrate, high softening temperature, good thermal shock resistance, and a coefficient of thermal expansion which approximately matches the substrate, but also the coating provides a visual indication whether the heating unit is hot or cold.

In accordance with the present invention, we have discovered a smooth surface electric heating apparatus comprised of a heat spreader plate of high thermal conductivity, an insulated electrical resistance heating element attached to the underside of the plate, a reinforcing member also attached to the underside of the plate to prevent warpage, a reflector pan beneath the heating element to direct the heat in an upward direction, and a thermochromic glass-ceramic coating bonded directly to at least the upper surface of the heat spreader plate.

The base glass-ceramic coating material consists essentially as calculated from the batch on the oxide basis in weight percent of the following:

| Ingredient | w/o |
| --- | --- |
| $Li_2O$ | 6-20 |
| $Al_2O_3$ | 0-10 |
| $SiO_2$ | 70-80 |
| $P_2O_5$ | 0.5-6.0 |
| $B_2O_3$ | 0-10 |
| $K_2O$ | 0-6 |
| ZnO | 0-5 | wherein the coefficient of expansion of the glass-ceramic is in the range of $80-120 \times 10^{-7}$ per °C. The thickness of the thermochromic glass-ceramic coating should be sufficient to form a protective coating on the surface of the heat spreader plate and typically is about 3 to 12 mils. It is comprised of a crystalline phase of predominantly lithium disilicate ($Li_2O \cdot 2SiO_2$) in a glassy matrix. In order to obtain the desired strength properties the amount of lithium metasilicate ($Li_2O \cdot SiO_2$) should be kept to a minimum. The percent crystallinity may vary to some extent and is preferably up to about 50 percent and may be somewhat higher as determined by X-ray diffraction techniques.

The thermochromic additive is basic lead chromate ($PbO \cdot PbCrO_4$) which is described in some detail under Pigments (Inorganic), Encyclopedia of Chemical Technology, 2nd Edition, Vol. 15, Pages 530-532. Addition of basic lead chromate to the base composition may be either during mixing of the batch ingredients prior to smelting or as a mill additive after smelting. The desired thermochromic change is yellow at room temperature to red and red-brown at elevated temperatures. This change is reversible. While the phenomena is not completely understood, it is believed that the initial yellow or sometimes orange color is attributed to the presence of hexavalent chromium which appears to be stabilized by lead oxide. The amount of basic lead chromate which is capable of producing the desired effect is generally in the range of 1-10 weight percent of the base glass-ceramic material with the optimum amount being about five weight percent. When the amount of basic lead chromate tends to exceed a maximum of about 10 weight percent, the glass-ceramic material becomes degraded through an alteration of the phase relationship which adversely affects the properties of the coating, while the presence of less than about one weight percent does not produce a sufficiently pronounced thermochromic effect. It should be noted that the manner in which the basic lead chromate is incorporated in the base composition, e.g. by mill addition or by smelting, may cause some variations in the resultant initial color and subsequent thermochromic properties due in part to the effect of the increased temperatures of smelting and prolonged smelting times. However, such factors would be obvious to a person of ordinary skill in the art and their proper control can be determined by routine experimentation.

The invention is more clearly understood from the following description taken in conjunction with the accompanying drawing in which:

FIG. 1 is a partially broken-away plan view of a smooth surface electrical heating apparatus employing the present invention;

FIG. 2 is a fragmentary cross sectional view of the surface electrical heating unit of FIG. 1 taken along line 2—2 with parts broken away to show the various portions of the assembly; and FIG. 3 is another fragmentary cross sectional view taken along line 2—2 of a modification of FIG. 2 illustrating a further embodiment of the invention.

Turning now to a consideration of the drawings and in particular to FIG. 2, there is shown a fragmentary cross sectional view of a smooth surface electrical heating unit 10 which has a heat spreader plate 12 of high thermal conductivity, preferably of a thin composite metal sheet material with a thin center core 13 for distributing the heat rapidly over the entire plate so as to obtain a generally uniform temperature distribution. Such a core would be selected from metals and alloys such as copper, silver and aluminum. Copper has very low strength at temperatures ranging in the vicinity of 700°C., and also it oxidizes very readily. Since a copper core sheet 13 is of small thickness, on the order of 0.040 inches, it would tend to warp or deform easily under normal use conditions due to thermal stresses caused by temporary uneven temperature distribution during the preheat period and also due to the high temperatures to which it is exposed. Hence, the core 13 is sandwiched or sealed between two thin, integral skins 15 and 17, each of the thickness of about 0.017 inches. Such skins would be selected from metals and alloys such as stainless steel, nickel and chromium. In any selection of materials it should be borne in mind that the core and skin materials should have matched coefficients of thermal expansion or that the skin materials be of sufficient strength to support the stresses arising from any thermal mismatch without distortion. In order to avoid exposure of the copper on the peripheral edge of the plate, the two stainless steel skins 15 and 17 are sealed over the edge of the core with a pinching action to protect against corrosion and oxidation. The stainless steel skins 15 and 17 being on the outer surface of the composite plate 12 provide strength to the plate and resists warpage because it combines a high strength with high heat diffusivity, which no single material plate can provide. This thin composite sheet material 12 is illustrated by a central copper core 13 and two outer stainless steel skins 15 and 17, and it may be formed of individual sheets which are "area welded" by a process such as explosive welding, which causes a bonding of the metal sheets along their mating surfaces.

A metal sheathed resistance heating element 14 is brazed to the underside of the heat spreader plate 12. As is well understood by those skilled in this art, such a metal sheathed heating element 14 would include a central electrical resistance, nichrome heating wire of helical formation that is inserted into a thin metal tube or sheath of Inconel, stainless steel or the like. Then the sheath is filled with a suitable electrically insulating and thermally conducting material such as magnesium oxide (MgO) or the like to separate the heater wire from the metal sheath. The top surface of the heating element 14 is flattened so as to obtain a good contact area of the metal sheath with the heat spreader plate 12. Two terminals 19 of the heating element are shown in FIG. 1 extending down in a vertical direction beneath the heating element 14, and are adapted for receiving a slip-on connector (not shown) for making an electrical connection therewith as is conventional in this art.

In order to strengthen the heat spreader plate 12, the edge of the plate is provided with a downturned flange 22 thereby giving the heat spreader plate a configuration similar to an inverted shallow pan. Another means of reinforcing the heat spreader plate 12 is to provide a series of diagonal or radial struts 16 which are arranged edgewise and fastened to the underside of the heat spreader plate and possibly to the sheath of the heating element 14 as by brazing or similar methods. Such strut members 16 may be of many different configurations as would be obvious to a person of ordinary skill in the art. The purpose is to give the heat spreader plate sufficient depth or beam action so that it does not deflect readily under thermal or mechanical stresses.

As shown in FIG. 2, a reflector pan 18 is provided beneath the heating unit 10 and separated therefrom by an annular heat resistant spacer 20, so as to direct the heat from the heating element 14 in an upward direction. This reflector may be used as a hold down means for the heating unit. An adjustable tension member in the form of an inverted J-bolt 39 is adapted to be connected between a reinforcing member 38 and the reflector pan 18. The reinforcing member 38 is provided with an aperture 41 through which the head of the J-bolt is inserted. The reflector pan 18 has a central opening 43 for receiving the lower end of the J-bolt therethrough. The lower end of the bolt has a threaded portion for receiving an adjusting nut 45 thereon.

Turning now to the unique improvement of the present invention, the thermochromic glass-ceramic coating 30 discussed hereinabove is bonded directly to the surface of the heat spreader plate 12. In the embodiment shown in FIG. 2 the thermochromic glass-ceramic coating is applied only to the upper surface and covers the portion exposed to view on the surface of the heating apparatus. On the other hand, it may be advantageous to coat both the top surface and the bottom surface of the heat spreader plate 12 together with the heating means 14 as illustrated by FIG. 3.

In forming the thermochromic glass-ceramic coating 30, the batch ingredients are initially weighed and mixed as, for example, by ball milling. Then the batch is melted at elevated temperatures of about 1200°–1250°C. to form a homogeneous melt, quenched in cold water, and ball milled to a particle size of about −100 mesh U.S. Standard. The glass particles are thereafter combined with about 3–4 percent by weight of a suspending agent, e.g. clay, calcined clay, or colloidal silica and minor amounts of other conventional additives, e.g. electrolytes such as sodium pyrophosphate, sodium nitrite, to form an aqueous slip. The metal substrate is prepared for forming an adherent coating by sandblasting or oxidizing the metal surface and then the aqueous slip is applied to the metal substrate by conventional means such as spraying, dipping or coating. The coated metal substrate is now dried to remove the vehicle and the enamel is matured at a sufficient temperature of about 1000°C. for about 1–3 minutes. While the exact heat treatment for nucleation and crystal growth will vary to some extent with the initial glass composition within the ranges described, we have found that generally the optimum conditions for nucleation are about 500°–650°C. for about 0.25–1 hour, while the crystal growth temperatures are preferably about 750°–900°C. for about 0.5–4 hours. When the growth temperature is below about 750°C., the predominant crystal phase is lithium metasilicate and additionally when the growth temperature exceeds 950°C. the crystal phase is converted to the lithium metasilicate.

Coatings of our novel glass-ceramic materials, on a surface heating unit as shown in FIG. 1, had excellent mechanical, thermal and chemical properties. Thus, the coatings showed excellent stain resistance to mild organic acids as found in lemon juice, ketchup, barbecue sauce, etc. The thermal properties of the novel glass-ceramic coated heating unit are illustrated by the fact that when sodium chloride (m.p. 801°C.) was sprinkled on the surface of an energized heating unit, the salt became molten while the glass-ceramic coating still remained rigid, maintained its adhesion to the metal substrate, and was not attached by the molten salt. It should be noted that the glass-ceramic coatings useful in the present invention may be distinguished from those described in U.S. Pat. No. 2,920,971 in that the latter materials have a coefficient of expansion of about $0 \times 10^{-7}$ per °C. whereas our materials are substantially higher and more closely match the thermal expansion of the metallic substrates used in the heat spreader plate. Other commercially available enamels fail to meet the mechanical, thermal or chemical requirements for making the high temperature surface heating unit of our invention.

Our invention is further illustrated by the following examples. The compositions, unless otherwise noted, are given in weight percent and mole percent as calculated from the batch on the oxide basis. Initially glasses were prepared by melting the batch ingredients under standard conditions at temperatures of 1200°–1600°C. for about 4–20 hours in platinum crucibles.

EXAMPLE I

A preferred glass composition was prepared and melted from batch ingredients to yield the following formulation on the oxide basis:

| Constituent | Weight % | Mole % |
| --- | --- | --- |
| $SiO_2$ | 73.0 | 67.5 |
| $Li_2O$ | 13.7 | 25.4 |
| $K_2O$ | 5.6 | 3.3 |
| $Al_2O_3$ | 4.9 | 2.7 |
| $P_2O_5$ | 2.8 | 1.1 |

The batch ingredients were weighed and mixed by ball milling. The batch was then placed in a platinum crucible and melted at a temperature of 1200°–1250°C. overnight. The hot melt was quenched in cold water and ball milled to a particle size of −100 mesh U.S. Standard.

A slip for application onto a metal plate was prepared from the following formulation:

| Ingredient | Parts by Weight |
| --- | --- |
| Glass frit (−100 mesh) | 1000 |
| Ferro No. 55 Clay (calcined) | 40 |
| Sodium aluminate | 2.1 |
| Bentonite | 2.1 |
| Gum tragacanth | 0.2 |
| Potassium carbonate | 2.5 |
| Distilled water | 460 |

The mixture was ball milled for about one hour to form a homogeneous dispersion. The slip was then applied to yield a fired thickness of 0.006 inches onto a metal plate by the following technique. The slip was adjusted to a specific gravity of 1.68 gm/cm³ by the addition of water. Electrolytes such as tetrasodium pyrophosphate or sodium nitrite were added to adjust the consistency of the slip to the point that a metal sheet dipped into the slip would retain about 36 grams of slip per square foot of metal area on removal and drainage of the metal part.

In applying the slip onto the metal substrate, the surface of the metal was initially prepared for obtaining an adherent coating by sandblasting and/or oxidizing the metal. The slip was loaded in a spray gun container and applied to the substrate. Thereafter the sprayed substrate was dried at a temperature of about 100°C., the dried coated substrate was fired at a temperature of 1000°C. for one minute and cooled to room temperature. Then the glassy material was nucleated at a temperature of 645°C. for one hour and subjected to a crystal growth treatment of 830°C. for four hours. The predominant crystalline phase obtained was lithium disilicate ($Li_2O \cdot 2SiO_2$). The base glass-ceramic coating was not thermochromic and was used for purposes of comparison.

Metal substrates coated by the above technique or modifications thereof included the following:

316L Stainless steel clad copper
321 Stainless steel[a]
430 Stainless steel[a] clad copper
Inconel 600 (International Nickel Co., 72 percent min. Ni, 14–17% Cr, 6–8% Fe, 1.75–2.75% Nb, hot rolled and heat treated for high temperature applications)
Inconel 625 (International Nickel Co.)
Rene 41 (General Electric Co., a precipitation hardened Ni based, high temperature alloy)
Ti-Namel (Inland Steel Co., 0.06 C., 0.30 Mn, 0.12 max. Cu, 0.05 Al, 0.30 Ti, bal. Fe, hot rolled, for sheets for enamelling, specially prepared)
Ti-Namel clad copper
Enamelling steel
  NOTE: (a) These stainless steels are designated by AISI type numbers.

EXAMPLE II

Following the procedure of Example I, the preferred glass composition was prepared, melted and then milled to a particle size of −100 mesh. The slip for application to the metal plate was prepared from the same formulation as Example I with the addition of 50 parts by weight of PbO·PbCrO$_4$ and the mixture was ball milled for about one hour to form a homogeneous dispersion.

The slip was then applied to a metal plate of Rene 41 (a precipitation hardened Ni based, high temperature alloy) to yield a fired thickness of about six mils. Following the procedure of Example I, the sprayed metal plate was dried at a temperature of about 100°C., the dried coating was fired at a temperature of 1000°C. for one minute and cooled to room temperature. Then the glassy material was nucleated at a temperature of 645°C. for one hour and subjected to a crystal growth treatment of 830°C. for four hours.

After the crystallized material was cooled to room temperature it had a yellow appearance. The coated metal plate was then subjected to numerous heating cycles up to 600°C. A reversible thermochromic color transformation was observed whereby the color of the coating changed upon heating as follows:

| Color | Temperature |
|---|---|
| Pale Yellow | room temperature |
| Mustard Yellow | 194°C. |
| Yellow-Orange | 284°C. |
| Reddish-Yellow | 373°C. |
| Reddish-Orange | 450°C. |
| Reddish-Brown | 532°C. |

Upon cooling the color change was observed to proceed in the reverse order.

EXAMPLE III

Following the procedure of Example II, four weight percent of PbO·PbCrO$_4$ is smelted in with the preferred glass composition of Example I. After the coating is fired onto a metal plate in accordance with the firing schedule of Example II, similar thermochromic color transformations are observed.

It will be appreciated that the invention is not limited to the specific details shown in the examples and illustrations and that various modifications may be made within the ordinary skill in the art without departing from the spirit and scope of the invention.

We claim:

1. A surface heating apparatus comprising a metallic heat spreader plate of high thermal conductivity, an insulated electrical resistance heating element attached to the underside of said plate for heating thereof, and a thermochromic glass-ceramic coating covering at least the upper surface of the plate, said thermochromic glass-ceramic consisting essentially as calculated from the batch on the oxide basis in weight percent of 6–20% Li$_2$O, 0–10% Al$_2$O$_3$, 70–80% SiO$_2$, 0.5–6.0% P$_2$O$_5$, 0–10% B$_2$O$_3$, 0–6% K$_2$O, and 0–5% ZnO, and 1–10% PbO·PbCrO$_4$ to impart a reversible color transformation to the coating upon exposure to temperature changes, wherein the coefficient of expansion of the glass-ceramic is in the range of 80–120×10$^{-7}$ per °C. and the major crystalline phase is lithium disilicate.

2. The heating apparatus of claim 1, comprising additionally a reinforcing member attached to the underside of said plate to prevent warpage and a reflector pan beneath the heating element to direct the heat in an upward direction.

3. The heating apparatus of claim 1, wherein said glass-ceramic coating has a thickness of about 3 to 12 mils.

4. The heating apparatus of claim 2, wherein said coating covers both sides of the heat spreader plate and the heating element.

5. The heating apparatus of claim 1, wherein the glass-ceramic coating contains up to about 50 percent of a crystalline phase.

6. The heating apparatus of claim 1, wherein said glass-ceramic coating consists essentially as calculated from the batch on the oxide basis in weight percent of about 73.0% SiO$_2$, 13.7% Li$_2$O, 5.6% K$_2$O, 4.9% Al$_2$O$_3$, 2.8% P$_2$O$_5$ and 5% PbO·PbCrO$_4$.

7. The heating apparatus of claim 1, wherein said heat spreader plate is a composite metal sheet material having a core selected from the group consisting of copper, silver and aluminum placed between two integral outer layers of a metal or alloy selected from the group consisting of carbon steel, stainless steel, nickel and chromium.

* * * * *